UNITED STATES PATENT OFFICE.

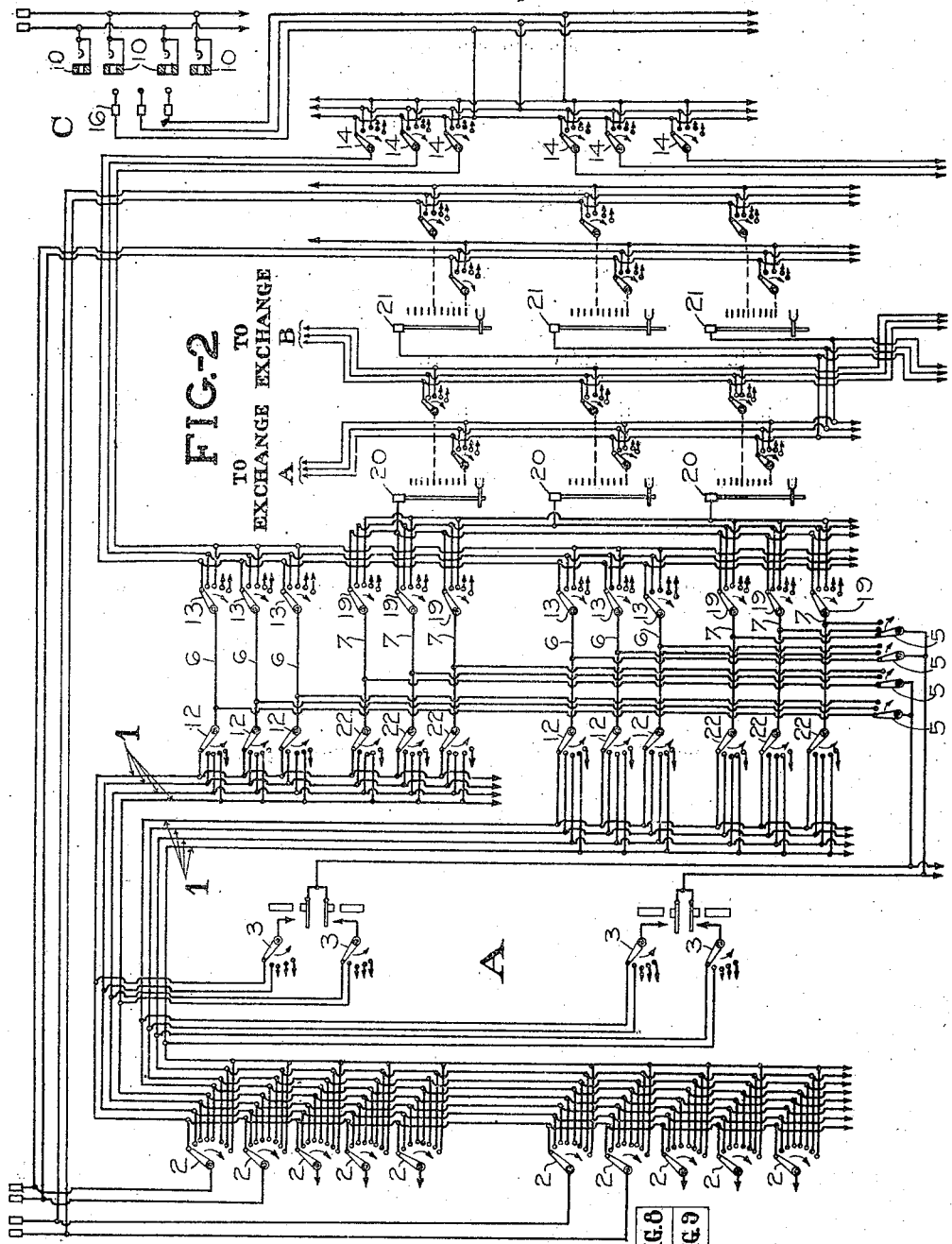

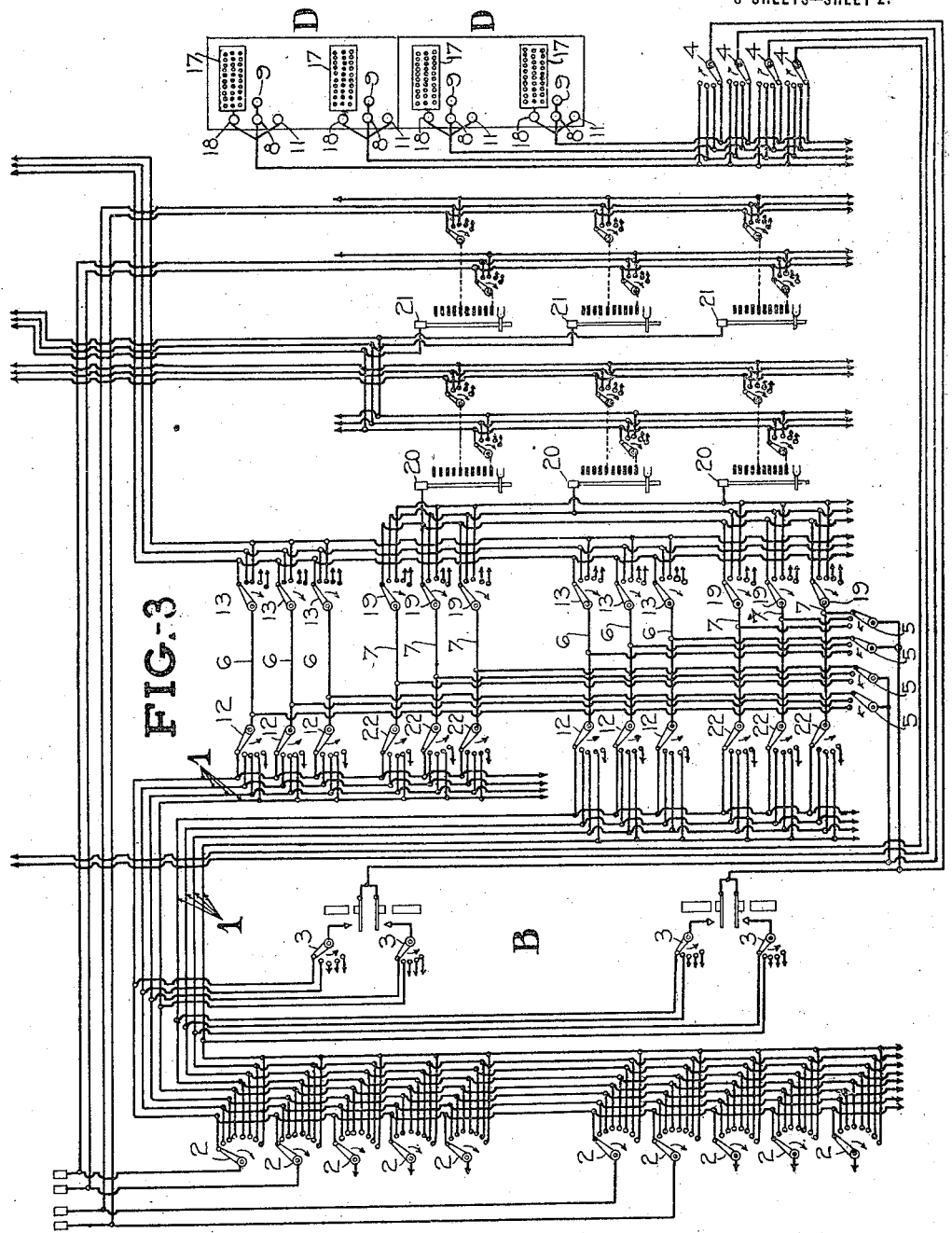

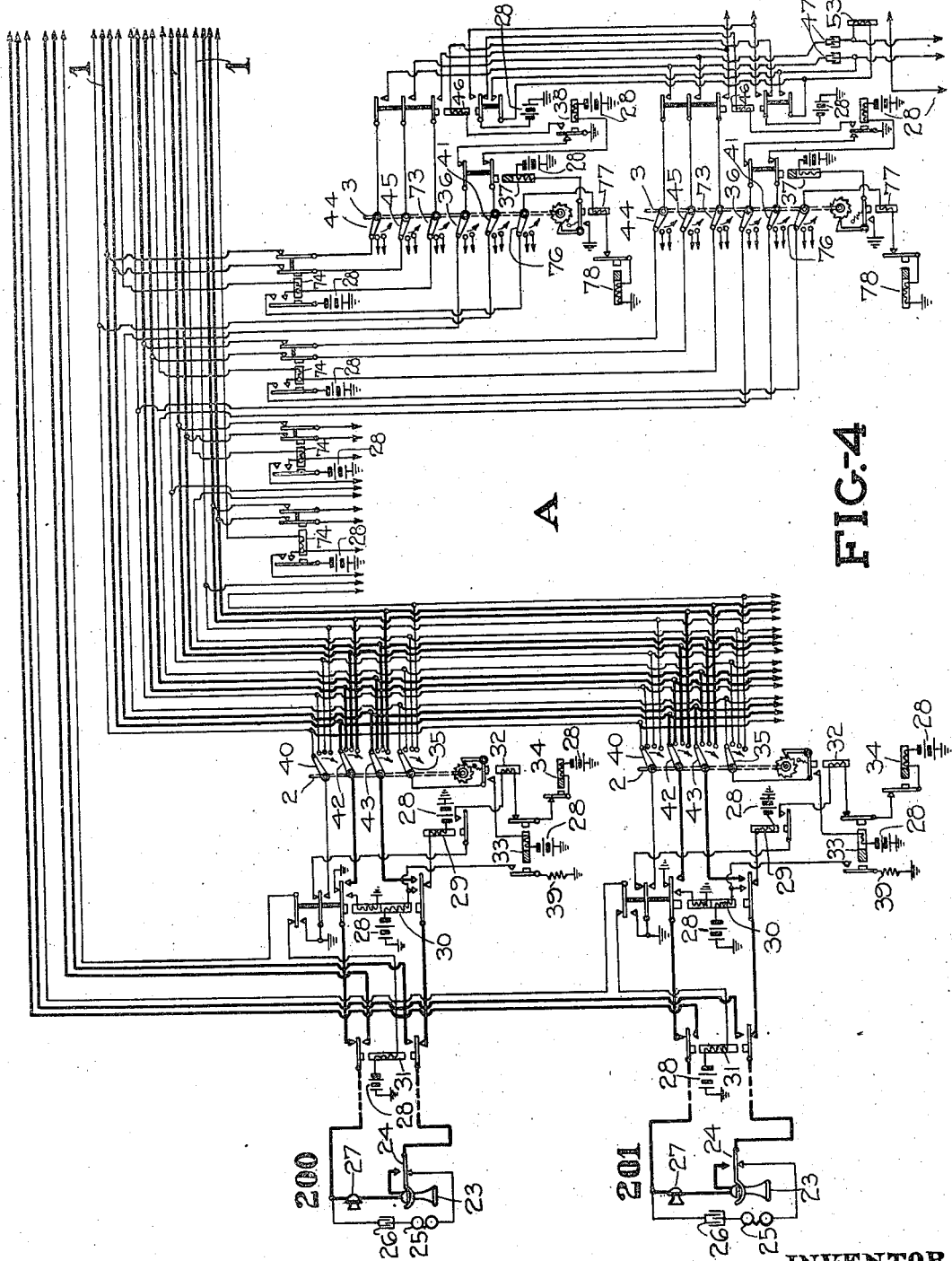

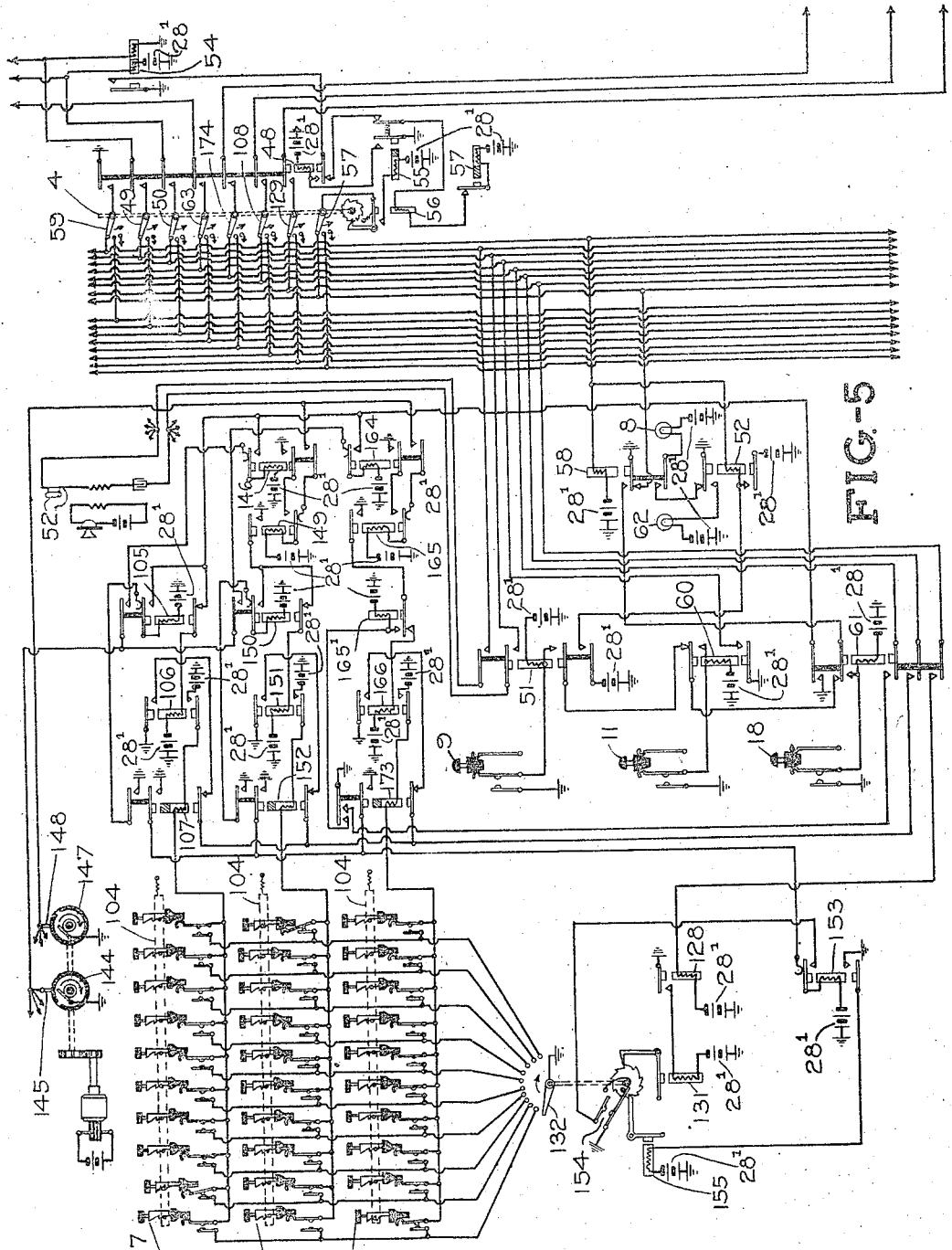

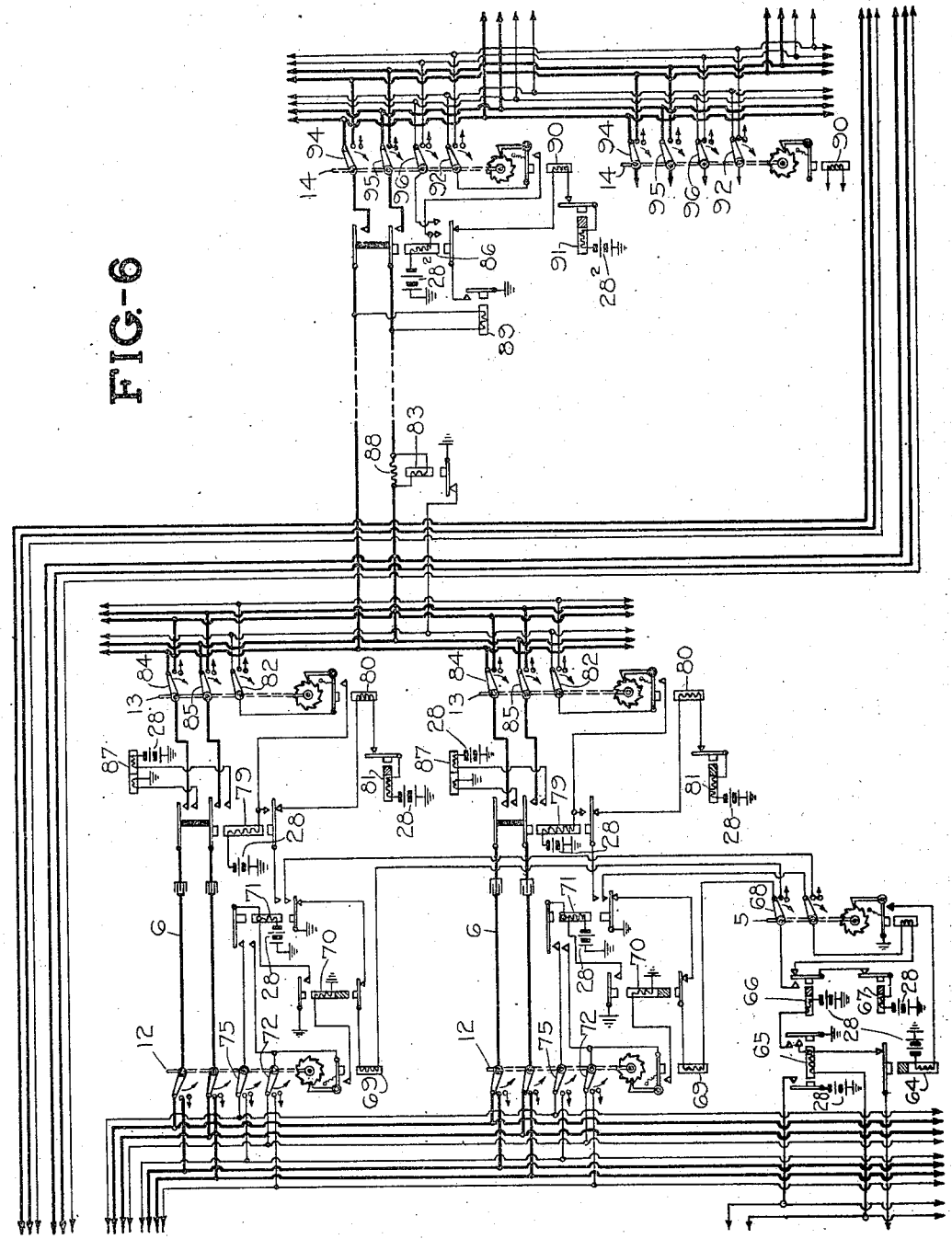

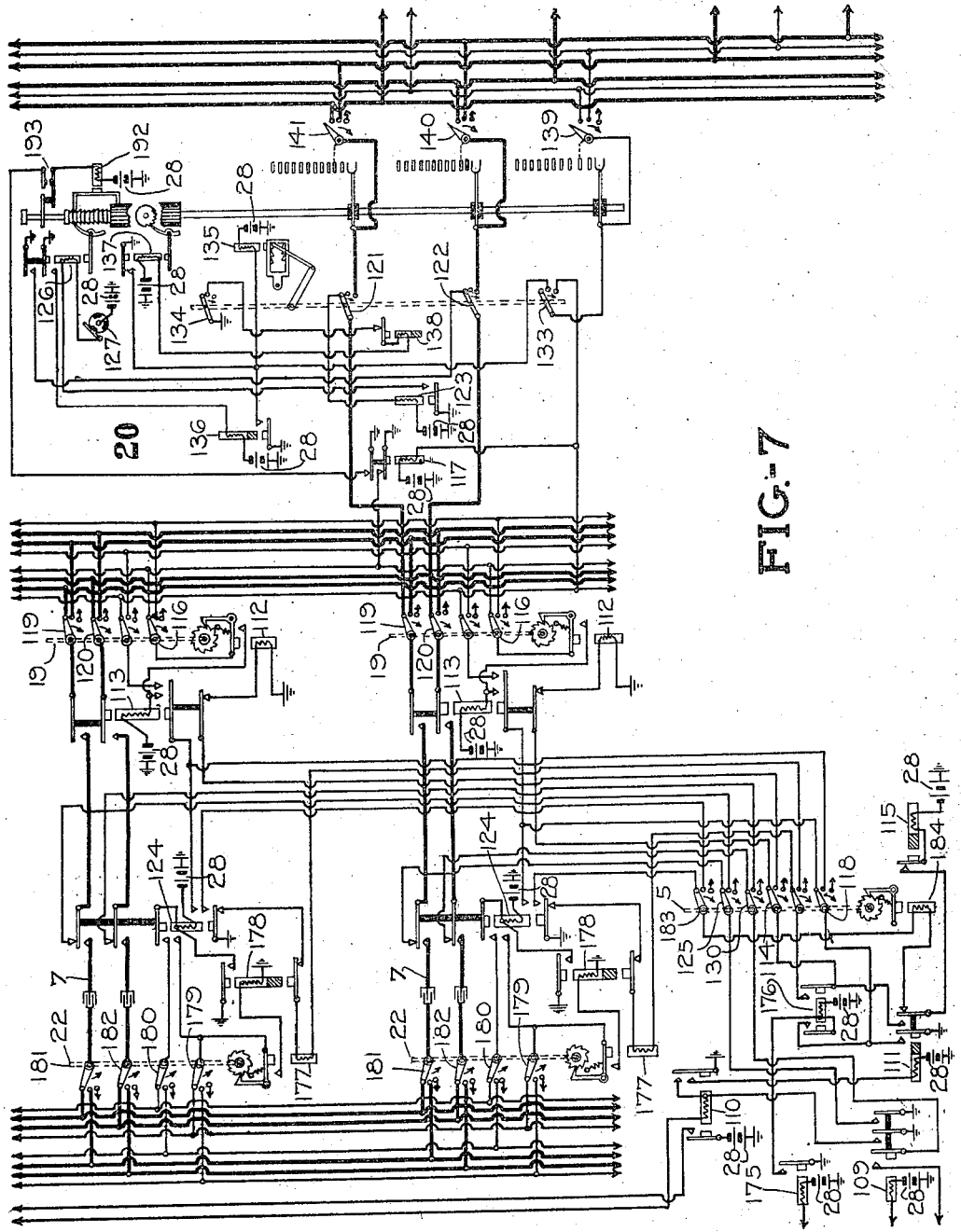

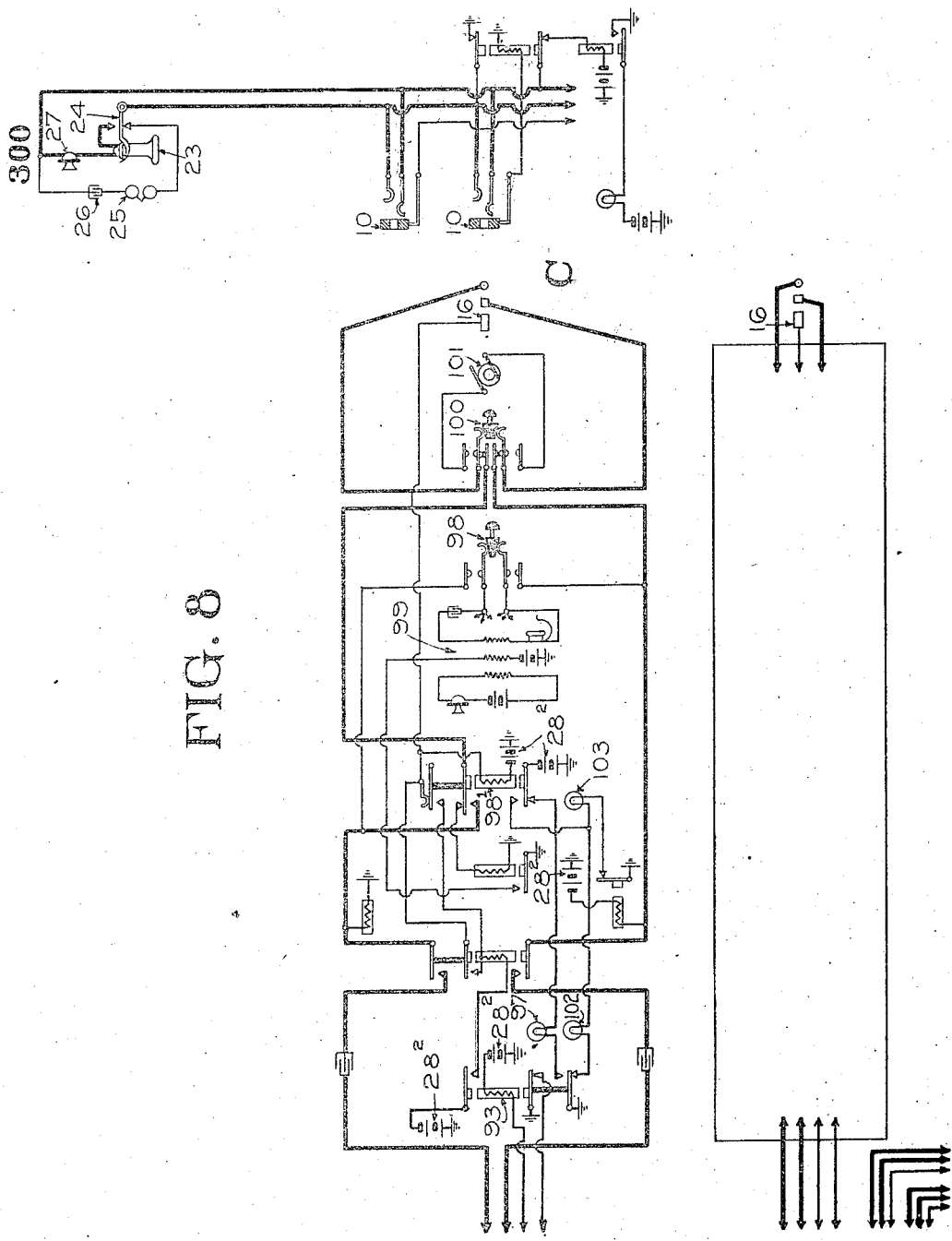

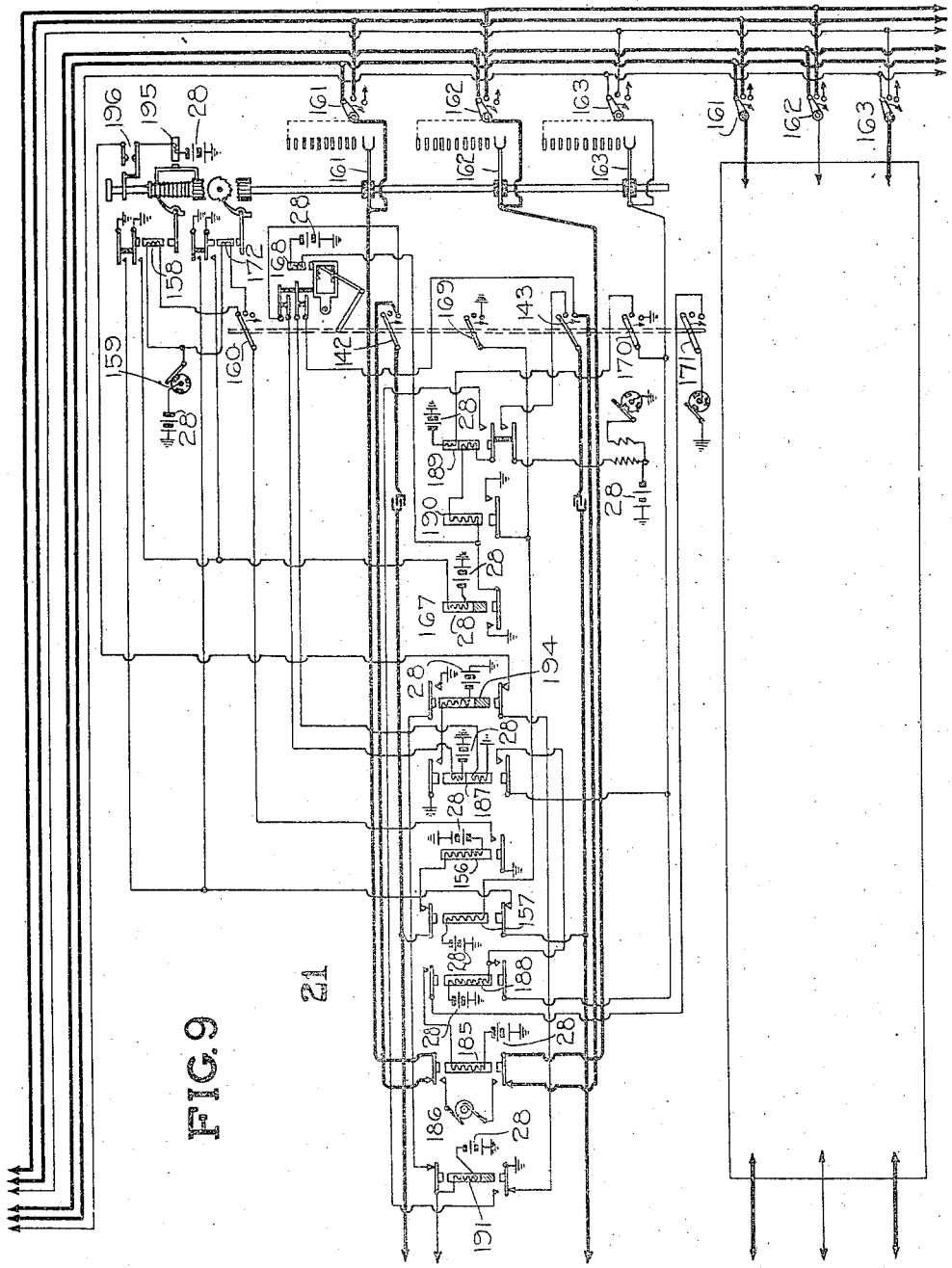

MORTON L. JOHNSON, OF CHICAGO, ILLINOIS, ASSIGNOR, BY MESNE ASSIGNMENTS, TO FRANK B. COOK COMPANY, OF CHICAGO, ILLINOIS, A CORPORATION OF ILLINOIS.

TELEPHONY.

1,147,246.  Specification of Letters Patent.  Patented July 20, 1915.

Application filed July 17, 1913. Serial No. 779,478.

*To all whom it may concern:*

Be it known that I, MORTON L. JOHNSON, citizen of the United States, residing at Chicago, in the county of Cook and State of Illinois, have invented a certain new and useful Improvement in Telephony, of which the following is a full, clear, concise, and exact description, reference being had to the accompanying drawings, forming a part of this specification.

My invention relates to telephone exchange systems and has a number of objects and advantages in view.

An embodiment of one of the features of my invention constitutes an improvement upon the system disclosed in my co-pending application Serial No. 709,422, filed July 15, 1912. In the system of my said co-pending application the operator employed selector and connector switches for connecting calling lines with link connectors that were used for joining calling and called lines.

In accordance with one feature of my present invention the calling line selects a switch that pertains to the link connector to be employed, this switch being actuated by the operator to connect such link connector with the calling line. In the preferred embodiment of the invention calling line extensions intervene between such switches that pertain to link connectors and are interchangeably associated with calling lines by means of selector switches interposed between such extensions and calling lines. In the system of my present invention the operator by means of suitable apparatus selects the link connectors which are to be selected by the calling subscribers. That is the operator places idle link connectors in selectable condition. Apparatus is included in the equipment selected by the calling line and pertaining to the selected link connector and selected operator by which the operator effects connection between the selected link connector and the calling line.

My invention, in another of its characteristics, resides in the provision of means whereby a calling subscriber may select a plurality of operator controlled switches pertaining to different exchanges whereafter the operator may actuate that one of the calling line selected switches which pertains to the exchange to which the calling and called lines are to be connected. This feature of the invention is herein specifically practised by having the calling line select a plurality of link connectors each having switches at its ends for connecting calling and called lines with the link connectors, the operator selecting the link connector which will take part in extending the calling line into connection with the called line, though the invention and the claims are not herein limited to the selection of a plurality of link connectors by calling line.

In a co-pending application I have set forth a species of the genus herein claimed, such species including link connectors each having one switch for connection with calling lines and has many additional switches pertaining to different exchanges for connection with called lines.

The invention has as another of its characteristics the provision of a group of operators' positions, operator selector switches adjacent such positions, and calling line operated selector switches for selecting idle operator selector switches and setting such latter switches into motion to connect idle operators with calling lines. By means of this feature of the invention the operators' positions and the selector switches immediately associated therewith may be together located at one geographical center totally distinct from the various exchange centers, from which exchange centers the conductors for selecting these operator selector switches extend. The operators are provided with means preferably working over these latter conductors for effecting connections between calling lines and called lines extending to any of these exchanges.

While my invention is of particular utility in connecting telephone lines that extend to different exchanges, yet, the invention is not to be thus limited as it is of service in enabling an operator to select any desired extension that is to be applied to a calling line after connection has been established therewith and by way of such connection.

My invention, in another of its aspects, employs selector switches for interchangeably associating calling line extensions with calling lines and which calling line extensions are adapted to associate idle operator selector switches with calling lines, this feature of the invention being preferably embraced in a system wherein the operators are made common to a number of exchanges but to which characteristic the invention is not to be limited.

I will explain my invention more fully by reference to the accompanying drawings showing the preferred embodiment thereof and in which—

Figure 1 indicates the manner in which the various figures are to be assembled and read in connection with each other; Figs. 2 and 3 together indicate, in simplified form, a telephone exchange system equipped in accordance with the invention; and Figs. 4 to 9, inclusive, taken collectively as indicated in Fig. 1, illustrate in diagrammatic detail one circuit arrangement.

Like parts are indicated by similar characters of reference throughout the different figures.

Referring first more particularly to Figs. 2 and 3 I have there indicated a group of telephone lines in one telephone district extending to a telephone exchange A, another group of telephone lines in another telephone district extending to a telephone exchange B, and another group of telephone lines in another telephone district extending to a telephone exchange C. The lines which extend to exchanges A and B are provided with calling line extensions 1 that are interchangeably connected with calling lines by means of calling line extension selector switches 2 that operate to connect idle calling line extensions with calling lines. These calling line extensions are provided with waiting contacts that are included in switches 3 whose wipers rest upon waiting contacts pertaining to idle calling line extensions, the calling line extensions being divided into groups of say ten per group, each group having a switch 3. The switches 3 are divided off into pairs, each pair being individual to an operator selector switch 4 and to a pair of master switches 5, as this feature of the invention is herein embodied but to which feature the invention is not to be limited, the switches 5 of each pair being individual to different sets of link connectors 6, 7, the link connectors 6 having access to the exchange C and the link connectors 7 having access to the exchanges A and B by equipment which will hereinafter be fully set forth. The wipers of the switches 5 normally rest in circuit connection with idle link connectors and remain in such connection to enable the selected operator to work through the same in order to extend the link connector that is to be employed into connection with the calling and called lines. When a calling line has, by means of its selector switch 2, selected an idle operator selector switch 4 such idle operator selector switch is set into operation to select an idle operator at one or the other of the several positions D. There are desirably twice as many selector switches 4 as there are operators' positions so that two calling subscribers may select one position at the same time. The operator consequently has two signals 8 at each position each associated with a listening key 9 whereby the operator may effect communication with the calling subscribers that have selected her position. If the desired line is one of those lines which extend to the spring jacks 10 at the exchange C, the operator will select the link 6 which is associated with the calling line through the agency of the left hand switch 5 of the corresponding pair, and by means of the switching mechanism or key indicated at 11, will set the electro-magnetic switch 12 individual to the link connector 6 that is to be employed into operation to bring its wipers into connection with the calling line extension 1 that has become connected with the calling line by the selector switch 2 pertaining to the calling line. The operation of the switching mechanism 11 also occasions the operation of the electro-magnetic switch 13 companion to the employed switch 12, this switch 13 continuing in operation until it selects an idle trunk finder switch 14 which is thereupon set into operation until it finds an idle trunk terminating in a plug 16 adapted for insertion within a jack 10. Thus the operator causes the extension of a calling line to a manual board by the mere depression of the key 11 after her telephone has been cut into circuit with the calling line. If the called line extends to either of the other exchanges A, B, the operator will set up the number of the desired line by her key equipment 17 whereafter the operator will manipulate the switching mechanism or key 18 to associate the switching mechanism 17 with the right hand or connecting end of the link connector 7 that is associated with the right hand switch 5 that was related to the calling line. The switching mechanism 18 sets the electro-magnetic switch 19 at the connecting end of the employed link connector 7 into operation, this switch continuing in operation until it selects an idle selector switch 20 whereupon said switch 19 stops. The selector switch 20 continues in operation until it selects an idle connector switch 21 in a predetermined group whereafter such connector switch is operated until it connects the desired line with the employed link connector 7. After these operations the switch 22 at the left hand or answering end of the employed link connector 7 is set into operation to connect the calling line with said link connector 7. The calling line having either been extended to the manual board C or having become connected with the desired line extending to the exchange A or B, the equipment 3 which controls the association of the operator's equipment with the links 6 and 7 is operated to bring the employed switch 4 in condition again to be employed by another calling line. When the switches 12 and 13, in the case of the extension of a calling line to the manual exchange C, or the switches 19 and 22 have performed their functions the pair of switches 5 associated therewith are shifted into association with other and idle link connectors 6, 7.

Referring now more particularly to Figs. 4 to 9, inclusive, I will describe the system of my invention, as, it is preferably embodied, more in detail. I have illustrated two substations 200 and 201 whose lines extend to exchange A and a substation 300 whose lines extend to exchange C, it being obviously unnecessary to illustrate substations whose lines extend to exchange B in view of the similarity between exchanges A and B as outlined in Figs. 2 and 3. Assuming that station 200 is a calling station, the party there, in initiating a call, will remove his telephone receiver 23 from its switch hook 24 whereby the switch hook will leave its normal contact to open the bridge containing the bell 25 and condenser 26 and will engage its alternate contact to establish a bridge including the telephone receiver 23 and a telephone transmitter 27. The establishment of this telephone bridge will occasion a circuit traceable from the common grounded battery 28, the relay 29, the normal contact of the bottom armature switch of relay 30, said armature switch, the normal contact of the lower armature switch of cutoff relay 31, both sides of the calling line by way of the telephone bridge at its substation, the upper armature switch of relay 31 and its normal contact, the lower intermediate armature switch of relay 30 and its normal contact, to ground. The relay 29 is thereupon energized to establish a circuit traceable from the grounded upper intermediate armature switch of relay 30, the normal contact of this armature switch, the armature switch of relay 29 and its contact, the winding of motor magnet 32, the right hand armature switch of the sluggishly operating relay 33 and its contact, the armature switch of sluggishly operating relay 34 and its contact, to the grounded common battery 28. The motor magnet 32 thereupon sets the wipers of the switch 2 into operation until the wiper 35 engages a grounded waiting contact whereupon circuit is established through the sluggishly operating relay 33 to cause the attraction of its armatures, the right hand armature switch of this relay 33 on being attracted opening the circuit of the motor magnet 32 to cause the wipers of the employed switch 2 to remain in position to which they are brought. The circuit established for the relay 33 is traceable from the grounded battery 28, the winding of this relay, the armature switch of motor magnet 32 and its contact, the wiper 35, the contact engaged by this wiper, the wiper 36 of a free switch 3, the upper armature switch of a sluggishly operating relay 37, the contact of this armature switch, the normal contact of the armature switch of relay 38, this armature switch, to ground. When the relay 33 is energized the left hand armature switch thereof establishes a circuit traceable from the grounded resistance 39, say of two hundred fifty ohms, the left hand armature switch of relay 33 and its contact, the lower winding of relay 30, to the grounded battery 28. Relay 30 is now energized and in being energized a locking circuit is established for it traceable from the grounded battery 28, the lower winding of the relay 30, the left hand alternate contact of the bottom armature switch of this relay, both sides of the calling line by way of the armature switches of relay 31 and their normal contacts, the lower intermediate armature switch of relay 30, the left hand alternate contact of this switch, to the grounded upper winding of the relay 30. The upper intermediate armature switch of relay 30, which is grounded, now places ground upon the wiper 40 of the associate switch 2 and through the contact engaged by this wiper upon the waiting contact pertaining thereto which is engaged by the wiper 41 of a free switch 3. The circuit for relay 38 is thus completed by way of the lower armature switch of relay 37 whereby the grounded armature switch of this relay is removed from connection with the upper armature switch of relay 37 to unground the wiper 36 and the waiting contact engaged by the wiper 35 of the employed switch 2 and similarly positioned contact of other switches 2 in multiple connection therewith, similarly positioned waiting contacts of switches 2 in a group of say fifty being in multiple connection. Thus no other switch 2 in the same group can stop with its wipers upon waiting contacts that are in multiple with waiting contacts of an actuated switch 2 in the same group.

To maintain the motor magnet 32 in open circuit the armature of relay 29 is released owing to the breakage of the circuit for this relay 29 at the normal contact of the bottom armature switch of relay 30. The two lowermost armature switches of relay 30 now extend the calling line into telephonic connection with the wipers 42 and 43 of the switch 2 individual to the calling line, the waiting contacts engaged by these wipers, the waiting contacts engaged by the wipers 44 and 45 of the employed switch 3, said wipers, the two uppermost armature switches of relay 46 which was previously energized when the armature switch of relay 38 was attracted, the contacts of these latter armature switches, the condensers 47, the second and third armature switches from the top of those switches belonging to the relay 48 (now attracted as will hereinafter be specified), the contacts of these two armature switches, the wipers 49 and 50 of the operator selector switch 4 associated with the calling line, the waiting contacts pertaining to an idle operator's equipment and engaged by these wipers 49 and 50, the two upper armature switches of relay 51 (now energized as will appear), the contacts engaged by these armature switches, thence to the operator's telephone equipment 52. The path for the relay 46 is traceable from the grounded attracted armature switch of relay 38, the alternate contact of this switch, the winding of relay 46, the normal contact of the second armature switch from the bottom of the switches pertaining to relay 46 of the switch 3 companion to the employed switch 3, said armature switch, to the grounded battery 28. The lowermost armature switch of the energized relay 46 closes a bridge across the telephonic connection between the calling subscriber and the operator which bridge includes an impedance coil 53 to establish an obvious circuit for the relay 54 whereby the armature switch of this relay is attracted to close circuit for the motor magnet of the employed switch 4, which circuit is traceable from the grounded armature switch of relay 54, the contact of this switch, the lower armature switch of relay 48 and its normal contact, the right hand armature switch of sluggishly operating relay 55 and its contact, the motor magnet 56 of the employed switch 4, the armature switch and contact of the sluggishly operating interrupter relay 57, to the grounded battery 28'. The motor magnet 56 turns the wipers of the employed switch 4 until the wiper 57 encounters a waiting contact which is grounded by way of the upper grounded armature switch of relay 58 and its normal contact. When the wiper 57 encounters a grounded waiting contact the sluggishly operating relay 55 is energized to open the circuit of the motor magnet 56 at the right hand armature switch of relay 55 and to close the circuit of relay 48 at the left hand armature switch of relay 55, a locking circuit being established for the relay 48 by way of the alternate contact of its lowermost armature switch and the grounded armature switch of relay 54, the magnet 48 thereby maintaining the circuit of the motor magnet 56 open at the lowermost armature switch of relay 48 and its normal contact. The relay 48 being energized all of its upper armature switches engage their contacts, the uppermost grounded armature switch grounding the wiper 59 of the employed switch 4 to close circuit through the relay 58. When the relay 58 is energized the ground established by its upper switch upon the waiting contact engaged by the wiper 57 is removed at the normal contact of this armature switch. As the similarly positioned waiting contacts of the switches 4 are in multiple connection, the contacts of other switches 4 in multiple with the contact engaged by the wiper 57 of the employed switch are free of ground so that no other switch 4 later to be employed will stop in connection with the contacts that are in multiple with the contacts engaged by the wipers of the employed switch so that the signal device 8 whose circuit is closed at the lower armature switch of the employed relay 58 is restricted to association with but one calling line and cannot be selected while it is active or in selected condition. The operator will momentarily depress the non-locking self-restoring key 9 individual to the displayed signal 8 to energize the relay 51 which establishes a locking circuit for itself traceable from the grounded battery 28' through the winding of the relay 51, the lower intermediate armature switch of this relay and its then engaged contact, the upper armature switch of relay 60 and its normal contact, the next to the uppermost armature switch of relay 61 and its normal contact, the upper armature switch of relay 58 and its alternate contact, to ground, the two upper armature switches of the relay 51 thus bringing the operator's telephone equipment 52 to the desired association with the telephone equipment at the calling line station. When the key 9 is depressed and relay 51 is energized, a circuit is established from the grounded battery 28' through the lowermost armature switch of relay 51 and its contact, the winding of relay 52, to ground by way of the wiper 59 of the employed switch 4, an apparent locking circuit being established by the relay 52. The signal 8 thus has its circuit opened at the upper armature switch of relay 52 and another circuit is established for a signal 62 which constitutes a supervisory signal whose circuit is effaced when the link has become connected with a calling line.

If the desired line extends to the station C, the non-locking self-restoring button 11 will be momentarily depressed by the operator and if the desired line extends to exchange A or B the non-locking self-restoring button 18 will be momentarily depressed after the number of the desired line has been set up by a set of keys at 17. Assuming that the desired line extends to exchange C, the relay 60 will be energized by an apparent circuit when the key 11 is momentarily depressed, a locking circuit being established for the relay 60 traceable from the grounded battery 28¹, the winding of relay 60, the upper armature switch of this relay and its alternate contact, the next to the uppermost armature switch of relay 61 and its normal contact, the upper armature switch of relay 58 and its alternate contact, to ground. The circuit for relay 51 is now opened at the uppermost armature switch of relay 60 and its normal contact to disconnect the operator's equipment 52 from the calling line to enable the operator to use this telephone equipment 52 in connection with another calling line through the intermediation of another listening key 9 at her position. When relay 60 is energized a circuit is established traceable from the lower grounded armature switch of relay 60, the contact of this armature switch, the wiper 63 of the employed switch 4, the associate armature switch of relay 48 and its contact, the armature switch of relay 64 and its contact, the winding of relay 65, the armature switch immediately below the winding of the employed relay 46 and its alternate contact, to the grounded battery 28. An apparent locking circuit is established for the relay 65. Circuit for a sluggishly operating relay 66 is established by way of the upper contact of the right hand grounded armature switch of relay 65. A circuit is established by the relay 66 which is traceable from the grounded battery 28, the sluggishly operating interrupter relay 67, the armature switch of this relay, the armature switch of relay 66 and its alternate contact, the wiper 68 of the master switch 5 to be employed (the left hand master switch of the selected pair in Fig. 3) the waiting contact with which this wiper happens to be in connection, the winding of motor magnet 69 of the employed switch 12, the lower armature switch of the sluggishly operating relay 70 to the lower grounded armature switch of relay 71 by way of its normal contact. The wipers of the employed switch 12 continue to move until the wiper 72 engages a waiting contact that is free of direct ground but which is grounded through battery. The operator has grounded, through battery and free of direct ground, the waiting contact pertaining to the extension which the calling party has applied to his line so that the switch 12 will stop with its wipers upon the waiting contacts pertaining to the calling line by way of such calling line extension. The circuit then established by way of the wiper 72 is traceable from the grounded battery 28, the left hand armature switch of relay 65 and its engaged contact, (relay 65 having been energized by the depression of the key 11 as described), the armature switch immediately above the winding of the employed relay 46 and its engaged contact, the wiper 73 of the employed switch 3, the waiting contact engaged by this wiper, the winding of relay 74, the waiting contact engaged by the wiper 72 as described, this wiper, the armature of motor magnet 69, the contact engaged by this armature, the relay 70, to ground. When relay 70 is effectively energized it opens the circuit for the relay 69 at its lower armature switch, the upper armature switch of this relay 70 then establishing an apparent circuit for relay 71. The relay 71 thereupon establishes a locking circuit for itself traceable from the grounded battery 28, the winding of relay 71, the uppermost contact of the upper armature of relay 71, the wiper 75 of the employed switch 12, the waiting contact engaged by this wiper, the wiper 40 of the switch 2 employed by the calling line and its engaged waiting contact, the upper intermediate armature switch of relay 30 of the calling line and its alternate contact, to ground. The open circuit condition of the motor magnet 69 is maintained at the normal contact of the lower armature switch of the relay 71. The wiper 72 is now connected directly with ground by the two contacts of the upper armature switch of relay 71, the wiper 75, to ground at the upper intermediate armature switch of relay 30 pertaining to the calling line by a path previously traced. Similarly positioned contacts of the switches 12 pertaining to the same group of link connectors are in multiple relation so that no other switch 12 in the same group will stop in connection with contacts that are in multiple with contacts upon which the wipers of the employed switch rest. Circuit is now completed for the relay 74 which is traceable from the grounded upper intermediate armature switch of the relay 30 pertaining to the calling line, the alternate contact of this armature switch, the wiper 40 of the switch 2 pertaining to the calling line, the wiper 75 and its engaged contact, the two contacts of the upper armature switch of relay 71, the wiper 72 of the employed switch 12, the winding of relay 74, the wiper 73 of the employed switch 3 and its engaged contact, the intermediate armature switch of relay 46, the left hand armature switch of relay 65 and its engaged contact, to the grounded battery 28.

An apparent locking circuit is established for the relay 74 by way of its left hand armature switch and the lower contact of such switch. The upper contact of this left hand armature switch closes a circuit traceable from the grounded battery 28, this switch, its upper contact, the wiper 76 of the employed switch 3 and its engaged contact, the motor magnet 77, the armature switch of the sluggishly operating interrupter relay 78, to ground. The wipers of the switch 3 are now set into step by step movement until the wiper 76 engages a contact that is free from battery. To prevent faulty operation during the rotation of the wipers of the employed switch 3, the relay 37 is energized each time the armature of relay 77 is attracted and being sluggish in operation it maintains its armature switches in open circuit during the travel of the wipers so that the wipers 36 and 41 are then in open circuit. When the relay 74 was energized to start the motor magnet 77 into operation the circuit of relay 38 was opened at the lower armature switch of relay 37, the circuit of relay 46 being consequently opened at the alternate contact of the relay 38. When the relay 46 is thus deënergized its lower armature switch opens the bridge including the impedance 53 thereby in turn opening the circuit of relay 54 that in turn opens the circuit of relay 48, in turn opening the circuit of relays 52 and 58, that causes the circuit of the relay 60 to be opened thereby rendering the employed switch 4 free for use by another calling line. As a consequence of the opening of the circuit for relay 52, the circuit for signal 62 is opened at the alternate contact of the upper armature switch of relay 52 indicating to the operator that the switch 12 has connected the employed link 6 with the calling line.

The electro-magnetic switch 13 individual to the employed link 6 is, in the embodiment of the invention herein shown, next operated to extend the calling line to the exchange C. When relay 71 was operated a circuit was established traceable from the lower grounded armature switch of this relay, the two alternate contacts thereof, the lowest armature switch of relay 79 and its normal contact, motor magnet 80, the sluggishly operating interrupter relay 81 by way of its armature switch and contact, to the grounded battery 28. The motor magnet 80 is thereupon set into operation to turn the wipers of the employed switch 13 until the wiper 82 engages a grounded contact whereupon an obvious circuit is established for the relay 79 by way of the grounded armature switch of relay 83 and its contact. An apparent locking circuit is established for the relay 79 and the circuit for the motor magnet 80 is opened at the lower armature switch and normal contact of the relay 79 to cause the wipers of the employed switch 13 to remain at rest. When the two upper armature switches of relay 79 are attracted the calling line is extended into connection with the wipers 84 and 85 and through the contacts engaged by these wipers with the two upper armature switches of a relay 86 at exchange C. The relay 86 is energized further to extend the calling line, such energization occurring by the closure of circuit at the lower contact of each of the two armature switches of relay 79, such circuit being traceable from the grounded battery 28, the right hand winding of an impedance coil 87, the lower contact of the intermediate armature switch of relay 79, the upper contact of this switch, the wiper 85, the winding of relay 83 and the resistance 88 in parallel therewith, the winding of relay 89 of high impedance and say five hundred ohms resistance, the waiting contact engaged by the wiper 84 and said wiper, the two contacts of the uppermost switch of relay 79, to the left hand and grounded coil of the impedance 87. The relay 83 is energized to attract its grounded armature to remove ground from the waiting contact engaged by the wiper 82 of employed switch 13, and the similarly positioned waiting contacts of other switches 13 in the same group so that no other switch will stop in connection with the contacts that are connected with wipers of an employed switch 13, it being understood that similarly positioned waiting contacts of switches 13 in the same group are in multiple connection. The relay 89 attracts its armature to establish a circuit through the motor magnet 90, the sluggishly operating interrupter relay 91 and its armature switch and contact, and the battery $28^2$ located at the exchange C. The motor magnet 90 at the exchange C continues in operation until the trunk finder switch 14 at the exchange C becomes associated with an idle trunk terminating in a plug 16. This result occurs when the wiper 92 engages a waiting contact grounded through the intermediate armature switch of relay 93 at exchange C, the relay 93, which is individual to a plug 16, being deënergized when its associate plug is not selected for use. When the wiper 92 thus encounters a grounded waiting contact a circuit is established traceable from the intermediate grounded armature switch of relay 93, the contact engaged thereby, the waiting contact engaged by the wiper 92, said wiper, the armature of motor magnet 90, the contact engaged by the armature, relay 86, to the grounded battery $28^2$. The relay 86 is thereupon energized to draw down its two upper armatures to continue the calling line into connection with the wipers 94, 95, the waiting contacts now engaged by these wipers, and the talking sides of the cord or link connector terminating in the tip and sleeve contacts of the selected plug 16.

The lowermost armature switch of relay 86 is attracted to open the circuit of the motor magnet 90 to permit the wipers of the employed switch 14 at exchange C to remain at rest, an obvious locking circuit being established for the relay 86 by means of the attracted armature switch of relay 89 and the left hand alternate contact of the bottom armature switch of relay 86. The relay 93 is now energized by a circuit traceable from the grounded armature switch of relay 89, the contact of this armature switch, the bottom armature switch of relay 86 and its right hand alternate contact, the wiper 96 and its engaged waiting contact, the winding of relay 93, to the grounded battery $28^2$ at exchange C. When relay 93 is energized its intermediate armature switch is attracted to disconnect the ground from the waiting contact engaged by the wiper 92 of the employed switch 14. Similarly positioned waiting contacts of switches 14 in the same group being in multiple connection, another switch 14 in this same group cannot stop in connection with waiting contacts that are connected with the wipers of a previously employed switch 14. A circuit is established through the called signal lamp 97 in the presence of an operator at the exchange C, which circuit is traceable from the lower grounded armature switch of relay 93, the alternate contact of this switch, the called signal lamp 97, the lower armature switch of a relay 98; the normal contact of this switch, to the grounded battery $28^2$. The operator in response to the signal conveyed by the device 97 will depress her listening key 98 to include her telephone set 99 in circuit with the calling subscriber to ascertain the number of the line wanted whereupon the operator will insert the plug 16 individual to the signal device 97 into the jack 10 of the desired line, assuming that the test which she has made shows the wanted line to be idle. The operator next will also depress the ringing key 100 to bring the ringing generator 101 into circuit with the call bell 25. A calling supervisory signal 102 and a called supervisory signal 103 are illustrated but inasmuch as these signals are old and the apparatus for controlling their operation is well known a detail description of the circuit equipment illustrated in Fig. 8 will not be given nor will the line equipment of the lines extending to exchange C be further described as any suitable or well known line equipment may obviously be employed.

When the calling subscriber replaces his receiver upon its switch hook his relay 30 is deënergized to restore the calling line equipment to normal and remove the ground from the wiper 40 of the calling line. Ground is consequently removed from the wiper 75 of the employed switch 12 to cause the deënergization of relay 71 thereby removing ground from the wiper 72 to cause the deënergization of relay 74 to restore to an idle condition the equipment of the calling line extension 1 which was connected with the calling line, the electro-magnetic switches 2, 4, 12, 13, 14 (which is also true of switches 19 and 22 later to be discussed) preferably remaining in engagement with the waiting contacts with which they were brought into engagement in establishing the connection. When relay 71 is deënergized the circuit for relay 79 is opened at the upper alternate contact of the lower armature switch of relay 71, circuit for relays 83 and 89 being consequently opened at the lower contact of each of the two upper armature switches of relay 79. Circuit for relay 86 is now opened at the armature switch of relay 89 to restore the armature switches of relay 86 to normal. Circuit for relay 93 is finally opened at the left hand alternate contact of the lower armature switch of relay 86 whereby the calling subscriber's supervisory signal 102 is energized to indicate to the operator that the calling subscriber has restored his telephone receiver upon its switch-hook. When the operator receives the called subscriber's disconnect signal at 103 she will pull down the employed plug 16. Let it now be assumed that instead of the desired line extending to exchange C that it extends either to exchange A or B. In such case a link 7 is employed as is the switch 20 at the exchange where the call is initiated, each switch 20 having certain levels pertaining to the lines of its exchange when they are called lines and another level or levels pertaining to other exchanges to which the calling line is to be extended. The right hand switch 5 is the one now employed by the operator because of its association with the link 7 selected by the calling subscriber, this right hand switch 5 being appropriated by the operator by means of her key 18. The operation of key 18 does not occur however until the number of the desired line has been set up at the switching mechanism 17.

Referring particularly to Fig. 5, there are three horizontal rows of keys there illustrated, a previously depressed key in each row being restored by means of a ladder 104 common thereto when another key in the same row is depressed. The keys in the top row of the switching mechanism at 17 select the hundreds, the keys in the next row select the tens and the keys in the bottom row select the units. The first key in the top row selects the first group of a hundred, the next key the second group of a hundred, and so on. In the middle row the first key selects the tens group of the selected hundred group, the second key selects the second ten, etc. In the bottom row, the first key selects the digit one of the selected ten, the next key selects the digit two of the selected ten, etc. Let it be assumed, for the sake of simplicity, that the exchange A has five hundred lines capacity and exchange B has five hundred lines capacity. The first five keys in the top row at 17 of Fig. 5 will therefore pertain to the lines of exchange A and the remainder will pertain to the lines of exchange B. In such case the lines at exchange A will be numbered 100 to 599, inclusive and the lines at exchange B will be numbered 600 to 999, inclusive. The operator will therefore manipulate the keys at 17 merely with regard to the numbers of the wanted lines and without regard to the exchanges A or B to which these lines extend Assuming that calling line 200 desires connection with line 201, the operator will depress the second key at the left of the top row at 17 of Fig. 5, the last key of the middle row and the first key of the bottom row, whereafter she depresses the key 18 to energize relay 61, which thereupon establishes a locking circuit for itself traceable from the grounded battery 28[1], the winding of relay 61, the armature switch immediately above the winding of this relay, the alternate contact of this armature switch, the upper armature switch of relay 58 and its alternate contact, to ground, the relay 58 having been operated as previously described. Circuit for the relay 51 is opened at the armature switch of relay 61 immediately above its winding for purposes previously described. A circuit is established consequent upon the energization of relay 61 which is traceable from the uppermost armature switch of relay 61 and its grounded contact, the lowermost armature switch of relay 105 and its contact, the winding of relay 106, to the grounded battery 28[1]. When relay 106 is operated a circuit is established traceable from the grounded upper armature switch of relay 106, the contact of this switch, the lower armature switch of sluggishly operating relay 107 and the contact of this switch, the next to the bottom armature switch of relay 61, the contact engaged by this switch, the wiper 108 of the employed switch 4, and the contact engaged thereby, the second armature switch above the winding of relay 48 and its contact, the relay 109, to the grounded battery 28. The intermediate armature switch of relay 109 establishes a circuit traceable from the ground connected therewith, this switch, the contact engaged thereby, the winding of relay 110, the armature switch immediately below the winding of relay 46 and its alternate contact, to the grounded battery 28. Relay 110 establishes a locking circuit traceable from its right hand grounded armature switch, the upper contact of this switch, the winding of relay 110, to the battery 28 by the connections last traced. Relay 110 now closes an obvious circuit for the sluggishly operating relay 111. Circuit for the motor magnet 112 of the switch 19 that is to be employed is now established and is traceable from the winding of this motor magnet which is grounded, the bottom armature switch of relay 113, the wiper 114 of the employed switch 5 and the contact engaged thereby, the right hand armature switch of relay 111 and its alternate contact, the armature switch and contact of sluggishly operating interrupter relay 115, to the grounded battery 28. The switch 19 continues to travel until the wiper 116 encounters a contact grounded at the lower armature switch of relay 117, the relay 117 being deënergized when the switch 20 to which it is individual is idle. When the wiper 116 thus encounters a grounded waiting contact, it establishes an obvious circuit by way of the armature switch of relay 112 for the relay 113, the relay 113 establishing a locking circuit for itself traceable from the grounded battery 28, the winding of this relay 113, the left hand contact of the lower intermediate armature switch of this relay, the wiper 118 of the employed switch 5, the contact of the left hand switch of relay 111, this switch, to ground. The bottom armature switch of relay 113 opens the circuit of motor magnet 112 to permit the wipers of the employed switch 19 to remain at rest.

A circuit is established for the line relay 123 of the selected switch 20, which circuit is traceable from the grounded battery 28, the winding of the relay 123, side switch wiper 121 in its first position, the contact engaged by this wiper, wiper 119 and the contact engaged thereby, the top armature switch of relay 113, the contact engaged by this switch, the top armature switch of relay 124 of the employed link 7, the normal contact of this armature switch, the wiper 125 and the contact engaged thereby, the right hand armature switch of relay 109 and the contact engaged thereby, to ground. The vertical magnet 126 of the selected switch 20 now has its circuit established, this circuit being traceable from the grounded battery 28, the interrupter 127, the winding of the magnet 126, the armature switch of relay 123 and its contact, to ground. The wipers of the selected switch 20 continue in vertical movement until they reach the level determined by the depressed key in the first row, in this instance the second level. This result is accomplished through the intermittent energization of relay 128 included in circuit with the topmost armature switch of vertical magnet 126 each time this magnet is energized consequent upon each establishment of circuit at 127. The circuit of relay 128 is traceable from the grounded battery 28[1], the winding of the relay, the bottom armature switch of relay 61 and its contact, wiper 129 and its engaged contact of the employed switch 4, the armature switch immediately above the winding of relay 48 and its contact, the left hand armature switch of relay 109 and its contact, the wiper 130 of the employed switch 5 and its engaged contact, the upper intermediate armature switch of relay 124 and its normal contact, the upper intermediate armature switch of relay 113 and its contact, wiper 120 of the employed switch 19 and its engaged waiting contact, the side switch wiper 122 of the selected switch 20 in its first position, the contact engaged by this side switch wiper, the top armature switch of vertical magnet 126 and its contact to ground. Each time the relay 128 has its circuit closed, the armature switch of this relay establishes an obvious circuit for the motor magnet 131. The motor magnet, upon each energization, moves the wiper 132 one step, the first step of this wiper bringing it into engagement with the waiting contact that is connected with the left hand contact of the first key in each of the three horizontal rows at 17, the second step of this wiper bringing it into engagement with the waiting contact that is connected with the left hand contact of the second key in each of these three rows, and so on, each of the ten waiting contacts being correspondingly connected with successively ordered keys in the equipment at 17 as indicated clearly in Fig. 5. When the wiper 132, in the connection that is being put up, reaches the second waiting contact, the wiper 132, which is grounded, establishes a circuit traceable therefrom through the left hand contact of the second key in the top row at 17, the mate to this contact now engaged therewith, the winding of sluggishly operating relay 107, the bottom armature switch of relay 106, the contact of this armature switch, to the grounded battery $28^1$. When relay 107 is energized a circuit for the relay 109 is opened at the bottom armature switch of relay 107 whereby the circuit of the line relay 123 is opened at the left hand armature switch of relay 109 to open the circuit of the vertical magnet 126 at the armature switch of relay 123 whereby the vertical movement of the wipers of the selected switch 20 ceases and the side switch wipers 121, 122, 133 and 134 are brought into their second positions. This latter result is due to the opening of the circuit for the private magnet 135, which circuit was previously maintained during the vertical movement of the wipers by the armature switch of the sluggishly operating relay 136 whose circuit was intermittently established at the intermediate armature switch of the vertical magnet 126, though the circuit established by the relay 136 was not opened, owing to its sluggishness, until the circuit of the vertical magnet 126 was finally opened. The circuit of the rotary magnet 137 of the selected switch 20 is now established from the battery 28, the winding of this magnet, the sluggishly operating interrupter relay 138, the armature switch and contact of this relay, the side switch wiper 134 in its second position, to ground. The rotary magnet 137 continues to operate until wiper 139 engages an ungrounded waiting contact whereupon circuit for the private magnet 135 is opened, this circuit having been initially established at the upper armature switch of the rotary magnet 137. When the magnet 135 is deënergized the side switch wipers of the selected switch 20 are stepped into their third positions, the circuit for the rotary magnet 137 thereby being opened at the side switch wiper 134 in its third position to permit the wipers 139, 140 and 141 of the selected switch 20 to remain at rest in connection with the waiting contacts that pertain to an idle connector switch 21 in the selected group. The calling line is now further extended to the side switch wipers 142 and 143 of the employed connector switch 21.

When relay 107 was operated a circuit was established traceable from the grounded contact of its top armature switch, said armature switch, the middle armature switch of relay 105 and its normal follow-up contact, the winding of relay 105, to the grounded battery $28^1$. A locking circuit is established for relay 105 traceable from the grounded battery $28^1$, the winding of this relay, the alternate contact of the middle armature switch of this relay, the top armature of relay 61 and its contact, to ground. Circuit for relay 106 is now opened at the bottom armature switch of relay 105, the opening of the circuit of relay 109 being continued at the top armature switch of relay 106. The upper armature switch of the energized relay 105 closes a gap in a circuit traceable from the grounded brush contact of the interrupter 144, the disk of this interrupter, the brush 145 momentarily engaged with the disk once upon each revolution of the disk, the top armature switch of relay 105 and its engaged contact, the top armature switch of relay 146 and its normal follow-up contact, the winding of relay 146, to the grounded battery $28^1$. A locking circuit is established for relay 146 traceable from the grounded battery $28^1$, the winding of this relay, the top armature switch of the relay and its alternate contact, the top armature switch of relay 61, to its grounded contact. The bottom armature switch of relay 146 closes a gap in a circuit traceable from the grounded brush contact of the interrupter 147, the disk of this interrupter, the brush 148 momentarily engaged with the disk once upon each revolution of the disk, the bottom armature switch of relay 146 and its contact, the bottom armature switch of relay 149 and its normal follow-up contact, the winding of relay 149, to the grounded battery $28^1$. There is an interval of say a second of time between the connections of the brush 145 with its disk and the connection of the brush 148 with its disk to afford an ample interval in which the wipers 139, 140, 141 of an employed switch 20 may seek the waiting contacts that they are to remain in connection with. A locking circuit is established for relay 149 traceable from the grounded battery $28^1$, the winding of relay 149, the alternate contact of the lower armature switch of this relay, the intermediate armature switch of relay 146, to the grounded contact of this latter armature switch. The upper armature switch of the energized relay 149 closes a circuit traceable from its grounded contact, said armature switch, the bottom armature switch of relay 150 and its contact, the winding of relay 151, to the grounded battery $28^1$. The upper armature switch of relay 151 closes a circuit traceable from ground, said armature switch and its contact, the bottom armature switch of relay 152 and its contact, to the relay 109 by previously traced connections. The wiper 132 after having performed its function in connection with the first button in the top row at 17 is restored to normal owing to the establishment of a circuit at the intermediate armature switch of relay 107, this circuit being traceable from the grounded contact of this armature switch, said armature switch, the normal follow-up contact of the upper armature switch of relay 153, the winding of this relay, to the grounded battery $28^1$. A locking circuit is established for relay 153 traceable from the grounded battery $28^1$, the winding of this relay, the alternate contact of the upper armature switch of the relay, the contacts 154 which are closed upon the first movement of the wiper 132, to ground. The lower armature switch of relay 153 closes a circuit traceable from its grounded contact through said switch, the winding of release magnet 155, to the grounded battery $28^1$ whereby the restoring mechanism is permitted mechanically to move the wiper 132 to its initially off contact position. A circuit for the line relay 156 of the employed connector switch 21 is established which is traceable from the grounded battery 28, the winding of relay 156, the upper armature switch of relay 157 and its contact, the wiper 141 and its engaged waiting contact, the side switch wiper 121 in its third position and its engaged contact, thence by connections previously traced to the right hand armature switch of relay 109, to ground. When relay 156 is energized it establishes a circuit for the vertical magnet 158 of the employed connector switch 21, which circuit is traceable from the grounded battery 28, the interrupter 159, the vertical magnet 158, the side switch wiper 160, of the employed connector switch 21, the armature switch of relay 156 and its contact, to ground. The wipers 161, 162 and 163 of the employed connector switch 21 are moved vertically step by step until these wipers reach the level corresponding to the button which is depressed in the middle row at 17, Fig. 5.

A circuit is established each time the vertical magnet 158 is energized and is traceable from the top armature switch of this vertical magnet, the lower armature switch of relay 157 and its contact, the wiper 140 of the employed switch 20 and its engaged contact, the side switch wiper 122 in its third position, thence by connections previously traced to the relay 128 and grounded battery $28^1$, whereby the wiper 132 is moved until it engages the waiting contact corresponding to the key depressed in the middle row of the keys 17, in this instance the last key of the row. When the wiper 132 thus engages its last waiting contact, a circuit is established traceable from ground, the wiper 132, the engaged contacts of the depressed key in the middle row (the last key in this instance), the sluggishly operating relay 152, the lower armature switch of relay 151, to the grounded battery $28^1$. Circuit for relay 109 is now opened at the bottom armature switch of relay 152. The upper armature switch of relay 152 closes circuit through the relay 150 by way of the middle armature switch of this latter relay and its normal follow-up contact. An apparent locking circuit is established for relay 150 by way of its middle armature switch, and the alternate contact thereof. Circuit for relay 151 is now opened at the lower armature switch of relay 150, the upper armature switch of relay 151 then maintaining the open circuit for the relay 109 which was previously opened at the lower armature switch of relay 152. The energized relay 150 establishes an obvious circuit that includes the interrupter 144, the upper armature switch of relay 150, the upper armature switch of relay 164 and its normal follow-up contact, and the grounded battery $28^1$, the operation of relay 164 being similar to that of relay 146. The bottom armature switch of relay 164 now includes the interrupter 147 in circuit with relay 165 in a manner similar to that in which relay 149 was included in circuit with interrupter 147. Relays 164 and 165, upon their energization, established obvious locking circuits for themselves. The upper armature switch of relay 165 closes circuit for relay 166 again to close circuit of relay 109. When the relay 109 was previously deënergized circuit for relay 156 was opened at its right hand armature switch whereby the circuit of the vertical magnet 158 of the employed connector switch 21 was opened. The circuit for the sluggishly operating relay 167 is now opened at the intermediate armature switch of said vertical magnet 158 for a sufficient length of time to permit the private magnet 168 to have its circuit opened at the armature switch of relay 167 to cause the side switch wipers 142, 143, 160, 169, 170 and 171 of the employed connector switch 21 to be moved into their second positions. The circuit of the vertical magnet 158 is opened by the side switch wiper 160 when in its second position. When relay 109 is again energized as just previously explained, circuit for relay 156 is again closed whereby circuit for the rotary magnet 172 is established, this circuit being traceable from the grounded armature switch of relay 156, the contact of this switch, side switch wiper 160 in its second positon, rotary magnet 172, the interrupter 159, to the grounded battery 28. The upper armature switch of the rotary magnet 172 intermittently establishes a circuit for the relay 128 by connections previously traced to cause the wiper 132 again to move step by step (this wiper 132 having been previously restored to normal when the intermediate armature switch of relay 152 closes the circuit of relay 153 with consequent results similar to those following the closure of circuit at the intermediate armature switch of relay 107) until it engages a waiting contact that is connected with the contacts of an actuated key in the bottom row at 17, Fig. 5, in this instance the first key in this bottom row. When the wiper 132 engages such a contact a circuit is established traceable from ground through the wiper 132, the contacts of the depressed key in the bottom row at 17, the winding of sluggishly operating relay 173, the lower armature switch of relay 166 and its engaged contact, to the grounded battery $28^1$. Circuit for relay 109 is again opened, this time at the bottom armature switch of relay 173. Circuit for relay 156 is now opened at the right hand armature switch of the deënergized relay 109. Circuit for the rotary magnet 172 is now opened at the armature switch of relay 156. Assuming that the desired line is free for connection circuit for the private magnet 168, which was previously closed at the lower armature switch of sluggishly operating relay 167 during the operation of the rotary magnet, is now opened at the armature switch of relay 167 to bring the side switch wipers of the employed connector switch to third position in which the circuit of rotary magnet 172 is opened at side switch wiper 160 to cause the wipers 161, 162, 163 to remain in connection with waiting contacts belonging to the desired line. This result having been accomplished, the wiper 132 is again restored to normal owing to the establishment of circuit for the relay 153 at the intermediate armature switch of relay 173 in a manner similar to the establishment of a release circuit at the middle armature switch of relay 107.

The upper armature switch of relay 173 establishes a circuit traceable from ground, this armature switch, the intermediate armature switch of relay 61 and its contact, the wiper 174 of the employed switch 4 and its waiting contact, the third armature switch above the winding of relay 48 and its engaged contact, relay 175, to the grounded battery 28. The upper armature switch of relay 173 also establishes a circuit for relay $165^1$ to maintain the open circuit of relay 109 at the upper armature switch of relay 166. When relay 175 is energized it establishes a circuit traceable from its grounded armature switch, the contact engaged by this switch, the winding of relay 176, to the grounded battery 28. The relay 176 establishes a locking circuit for itself traceable from the grounded battery 28, the winding of relay 176, the left hand armature switch of this relay and its engaged contact, the left hand armature switch of relay 111 and its engaged contact, to ground. Circuit for the motor magnet 177 of the employed switch 22 is now established, being traceable from the lowermost grounded armature switch of relay 124, the normal contact of this switch, the lower armature switch of relay 178 and the contact of this switch, the winding of motor magnet 177, the right hand armature switch of relay 176 and its engaged contact, the right hand armature switch of relay 111 and its alternate contact, the armature switch of sluggishly operating interrupter relay 115 and its engaged contact, the winding of this relay, to the grounded battery 28. The wipers of the employed switch 22 are continued in movement until the wiper 179 engages a waiting contact that is grounded through the battery 28 but is free of direct ground, the circuit established being similar to that established by the wiper 72 of the switch 12 when a connection with a line at exchange C was being traced by way of a link 6. When the wiper 179 engages such a contact the relay 178 is energized to close an apparent circuit for the relay 124, a locking circuit being established for this relay by way of the wiper 180, this circuit being similar to that including the wiper 75 of the previously described switch 12. The wipers of the employed switch 22 now come to rest because the circuit of the motor magnet 177 is opened at the bottom armature switch of relay 124. The two uppermost armature switches of relay 124 now complete the connection between the calling line and the called line, the two upper armature switches of relay 113 having been brought into engagement with their contacts as previously described, it being understood that the calling line is continued to the wipers 181 and 182 that are in connection with waiting contacts pertaining to the selected calling line extension 1 joined with the calling line by operations previously explained. When the relay 124 is energized a circuit is established which is traceable from its lowermost grounded armature switch, the alternate contact of this armature switch, the wiper 183 of the right hand employed switch 5, the motor magnet 184 of said switch 5, the right hand armature switch of relay 111 and its normal contact, (relay 111 having been deënergized when wiper 179 became connected with a calling line extension 1 whereupon the corresponding relay 46 was deënergized as previously described to open the circuit of relay 110 at the armature switch immediately below the winding of the relay 46) the armature switch of the sluggishly operating relay 115 and its contact, the winding of this relay, to the grounded battery 28. The wipers of the switch 5 are caused to travel until wiper 183 engages an ungrounded waiting contact whereupon the circuit of magnet 184 is opened. The contacts of the wiper 183 are ungrounded when the links 7 to which they pertain are idle, such ungrounding occurring at the lowermost armature switches of the relays 124 individual to such links. When wiper 179 of the employed switch 22 engages the waiting contact pertaining to the calling line extension 1 selected by the calling line, the relay 46 is released in a manner previously described to open the circuit of the impedance coil 53 which in turn opens the circuit of the relay 54, to open the circuit of relay 48, which in turn opens the circuits of relays 52 and 58 thereby causing the deënergization of relay 61. Relays 52, 58, 48, 54 and 46 are all released in the manner and with the results previously specified in relation to the connection established by way of the link 6. The locking circuits for relays 105, 146 and 164 are opened at the top armature switch of the deënergized relay 61 whereafter the locking circuits of relays 149, 165¹ and 165 are opened in an obvious manner. The setting up equipment governed by the switch mechanism 17 is now restored to normal.

The wanted line being free, the side switch wiper 171 in its third position closes an automatically interrupted circuit that includes the ringing relay 185 which intermittently includes the ringing generator 186 in circuit with the desired line. When the called party answers the relay 187 is energized to close the circuit of relay 188 to exclude the ringing relay 185 from circuit, an apparent locking circuit being established for this relay 188. If the wanted line is not free for use the relay 189 is energized by way of the side switch wiper 170 in its second position and the wiper 163 in engagement with the contact which is grounded when the line wanted is not free. If the wanted line is a busy called line the contact engaged by the wiper 163 and the contact in multiple therewith are connected with ground by the side switch wiper 170 of the employed called line connector 21 in its third position. If the wanted line is a calling line such waiting contacts pertaining to the wiper 163 are grounded at the top armature switch of relay 30 pertaining to such called line which is a calling line. When the relay 189 is energized the circuit for the associate private magnet 168 is maintained closed, this circuit being traceable from the grounded battery 28 through the magnet 168, the relay 190, the lower winding of relay 189, the upper armature switch of this relay, the contact of this switch, the lower armature switch of relay 191 and its alternate contact, to ground. The side switch wipers of the seeking connector switch are thus held in their second positions whereby the side switch wiper 143 is effective in transmitting a busy tone to the calling subscriber by familiar apparatus which is illustrated but need not be described. When the calling party places his receiver upon its switch hook relay 28 of the calling line, relay 124 of the employed link 7, and relay 74 of the employed calling line extension 1, are deënergized, relay 124 opening the circuit for relay 113 at its lower armature switch, relay 113 in turn opening the circuit for relay 117 at the lower intermediate armature switch of relay 113, circuit for relay 191 being also opened at this latter place. When relay 117 is deënergized it closes circuit for release magnet 192 previously partially closed at the off normal switch 193 whereby the wipers of the corresponding switch 20 are restored to normal. When the called party places his receiver upon its switch hook the circuit for the relay 187 is opened at the switch hook of the called subscriber whereby the circuit of relay 194 is opened at the upper armature switch of relay 187. When relays 191 and 194 are both deënergized circuit for the release magnet 195 (previously partially closed at 196) is completely closed to restore the wipers of the employed connector switch to normal.

Cross reference is made to my co-pending application Serial No. 709,422, filed July 15, 1912, wherein I have disclosed a telephone exchange system including a plurality of subscribers' lines to be interconnected, and a plurality of double ended connector links having automatic selector switches through which connection may be effected between calling and called lines, and means associated with said links for transmitting selected impulses of different order for each of said switches whereby two subscribers may be connected through the links. Features not herein claimed are claimed in the said co-pending application.

While I have herein shown and particularly described the preferred embodiment of my invention I do not wish to be limited to the precise details of construction and circuit arrangement shown as changes may readily be made without departing from the spirit of my invention, but

Having thus described my invention I claim as new and desire to secure by Letters Patent the following:—

1. A telephone exchange system including telephone lines extending to different exchanges; telephone line extensions at one of the exchanges; selector switches operable by calling lines for associating idle telephone line extensions therewith; operators' telephone outfits common to said exchanges; selector switches at the same location with the operators' telephone outfits for selecting idle operators' outfits and operable by calling lines and associated therewith by said calling line extensions; electro-magnetic switches for effecting connection with called lines extending to one exchange; other electro-magnetic switches for effecting connection with called lines extending to another exchange; means for connecting an electro-magnetic switch of each kind with the same calling line; and switching mechanism at the operators' positions in controlling relation to said electro-magnetic switches.

2. A telephone exchange system including a plurality of groups of telephone lines; a plurality of electro-magnetic switches each individual to one of the groups of telephone lines and provided with means for connecting it interchangeably with the lines of the group to which it is individual; calling line extensions intervening between these electro-magnetic switches and the groups of telephone lines to which said switches are individual; means for associating said electro-magnetic switches with a calling line; and operator controlled means whereby an operator may employ a selected electro-magnetic switch in circuit between calling and called lines.

3. A telephone exchange system including a plurality of groups of telephone lines; a plurality of electro-magnetic switches each individual to one of the groups of telephone lines and provided with an electro-magnetic switching device for connecting it interchangeably with the lines of the group to which it is individual; means for associating said electro-magnetic switches with a calling line; and operator controlled means for operating a selected electro-magnetic switching device to include its associate selected electro-magnetic switch in circuit between calling and called lines.

4. A telephone exchange system including a plurality of groups of telephone lines; a plurality of electro-magnetic switches each individual to one of the groups of telephone lines and provided with means for connecting it interchangeably with the lines of the group to which it is individual; calling line extensions intervening between these electro-magnetic switches and the groups of telephone lines to which said switches are individual; operator controlled means for associating said electro-magnetic switches with a calling line; and operator controlled means whereby an operator may employ a selected electro-magnetic switch in circuit between calling and called lines.

5. A telephone exchange system including a plurality of groups of telephone lines; a plurality of electro-magnetic switches each individual to one of the groups of telephone lines and provided with an electro-magnetic switching device for connecting it interchangeably with the lines of the group to which it is individual; operator controlled means for associating said electro-magnetic switches with a calling line; and operator controlled means for operating a selected electro-magnetic switching device to include its associate selected electro-magnetic switch in circuit between calling and called lines.

6. A telephone exchange system including a plurality of groups of telephone lines; a plurality of electro-magnetic switches each individual to one of the groups of telephone lines and provided with means for connecting it interchangeably with the lines of the group to which it is individual; calling line extensions intervening between these electro-magnetic switches and the groups of telephone lines to which said switches are individual; means for associating said electro-magnetic switches with a calling line at the same time; and operator controlled means whereby an operator may employ a selected electro-magnetic switch in circuit between calling and called lines.

7. A telephone exchange system including a plurality of groups of telephone lines; a plurality of electro-magnetic switches each individual to one of the groups of telephone lines and provided with an electro-magnetic switching device for connecting it interchangeably with the lines of the group to which it is individual; means for associating said electro-magnetic switches with a calling line at the same time; and operator controlled means for operating a selected electro-magnetic switching device to include its associate selected electro-magnetic switch in circuit between calling and called lines.

8. A telephone exchange system including a plurality of groups of telephone lines; a plurality of electro-magnetic switches each individual to one of the groups of telephone lines and provided with means for connecting it interchangeably with the lines of the group to which it is individual; calling line extensions intervening between these electro-magnetic switches and the groups of telephone lines to which said switches are individual; operator controlled means for associating said electro-magnetic switches with a calling line at the same time; and operator controlled means whereby an operator may employ a selected electro-magnetic switch in circuit between calling and called lines.

In witness whereof, I hereunto subscribe my name this fourteenth day of July A. D., 1913.

MORTON L. JOHNSON.

Witnesses:
  G. L. CROGG,
  ETTA L. WHITE.